UNITED STATES PATENT OFFICE.

CHARLES W. HALL, OF NEW YORK, N. Y.

IMPROVEMENT IN METHODS OF INTRODUCING PURIFYING AGENTS INTO IRON.

Specification forming part of Letters Patent No. 194,674, dated August 28, 1877; application filed July 21, 1877.

*To all whom it may concern:*

Be it known that I, CHARLES W. HALL, of New York, in the county of New York and State of New York, have invented a new and useful Improvement in the Manufacture of Iron; and I do hereby declare that the following is a full and exact description of the same, reference being had to the accompanying drawings, and to the letters of reference marked thereon.

The object I have in view is the manufacture of a high grade of iron, adapted for boiler-plate, tension-rods, chains, and other articles requiring a tough iron, and also well adapted for conversion into a high grade of steel by a simple and economical method.

The invention which I have made therein consists, generally, in the application of purifying and converting material or agents to the flame in the fire-box after the metal in the furnace is under the influence of heat, all as more fully hereinafter explained.

In order that those skilled in the art may know how to use my improvement, I proceed to describe one mode or method of operating the same more fully.

The iron to be purified and converted is placed in the ordinary way in any proper smelting-furnace adapted to be heated sufficiently in any ordinary way. This iron may be any cast-iron or merchantable pig; but for the best results I prefer gray forge-pig. While the iron is under the furnace is under the influence of heat, and preferably about the time it begins to melt, I place in the fire-box in the flame of the fire, with or without additional fuel, a compound consisting of twenty pounds of oxide of manganese, one pound of potash, and nineteen pounds of common salt to each one thousand pounds of iron to be melted. I preferably apply these agents mixed together as a compound; but they may be applied separately, without reference to the order of their introduction into the flame, if the application of all is made at the same or about the same time. If the iron produced is to be used for making steel, I prefer to substitute borax for the potash. If the iron to be melted or the coal used in melting contains much sulphur, a portion of lime may be added to the agents already named. The proportions of the various agents may be changed a little with various qualities of pig and other iron to be melted, as experience may dictate; but the proportions I have given I have found to produce the best results with gray forge-pig.

It is apparent that other suitable purifying or converting materials or agents which are metallic salts and oxides may be used instead of those named by me, within the spirit of my invention, if the same are applied to the flame. The agents which I have mentioned, being applied to the flame, act upon the melting iron upon the hearth, and effect the work of purification and conversion while the iron is in the act of melting.

I am aware that each and all of the agents which I have named have been used in the manufacture of iron; but I am not aware that they or either of them have been used in the flame in the fire-box, or have been used in substantially the proportions which I have described.

The result of this process is a high grade of tough iron, suitable for the purposes before named, which it is apparent can be manufactured without great expense.

I am aware that it is old to inject purifying agents into or upon the mass of molten metal in a reverberatory furnace by means of a blast or otherwise, and do not claim the same.

What I claim, therefore, as new and my own invention, which I wish to protect by Letters Patent, is—

In the purification of iron, the method of introducing the purifying agents into or upon the metals under treatment, which consists in placing the purifying and converting materials in the flame of the fire-box of furnaces when the iron is hot and near the point of melting, whereby the draft acts as a conveyer, substantially as described.

This specification signed and witnessed this 17th day of July, 1877.

CHARLES W. HALL.

Witnesses:
A. G. LATHAM,
ELISHA R. COE.